May 11, 1937. E. W. MITCHEL 2,079,918
NUT SECURING DEVICE
Filed Jan. 27, 1936
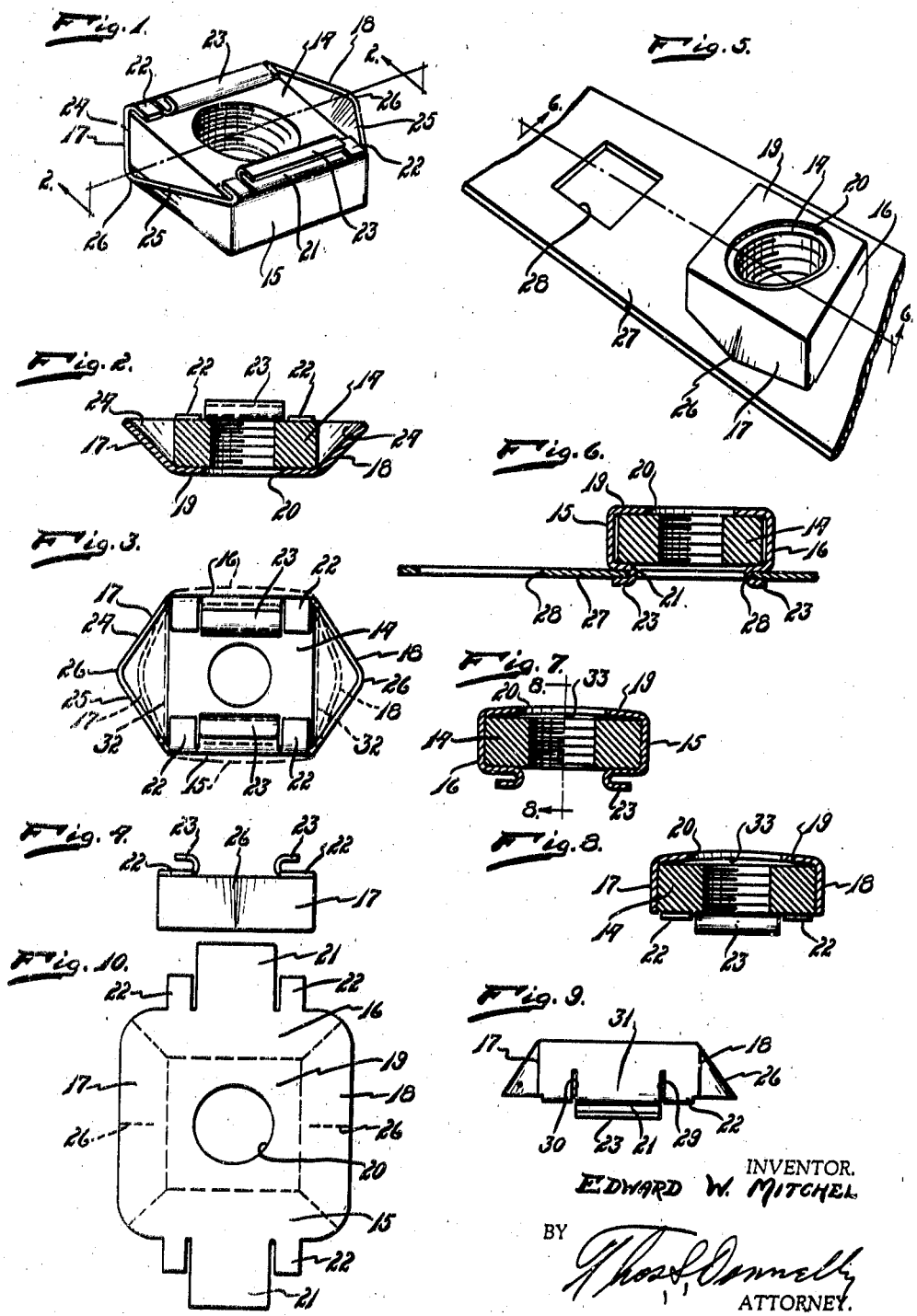
INVENTOR.
EDWARD W. MITCHEL
BY
ATTORNEY.

Patented May 11, 1937

2,079,918

UNITED STATES PATENT OFFICE 2,079,918

NUT SECURING DEVICE

Edward W. Mitchel, Detroit, Mich.

Application January 27, 1936, Serial No. 60,894

15 Claims. (Cl. 85—32)

My invention relates to a new and useful improvement in a nut securing device which may be mounted on a suitable supporting body and serve to retain a nut positioned thereon in proper location and in alignment with an opening through the supporting body so that a bolt projected through the opening may be threaded into the nut.

It is an object of the present invention to provide a securing device of this class which may be snapped into position in the opening.

Another object of the invention is the provision of a device of this class which is provided with securing portions capable of easily and quickly being moved into a fixed engagement with the supporting body without requiring any distortion of the engaging portions.

Another object of the invention is the provision of a securing device of this class having side walls for embracing the nut and provided with engagement portions projecting outwardly from one side, so arranged and constructed that relative approach or withdrawal of a pair of opposite side walls will effect a relative withdrawal or approach of the engaging members.

Another object of the invention is the provision in a securing device of a nut enclosing portion carrying engagement members disposed on opposite sides thereof, so arranged and constructed that a predetermined distortion or deformation of the nut enclosing portion will effect a further separation of the engagement members and secure them in the separated position so as to securely fix the device on a supporting body when the engagement members are projected through an opening therein.

Another object of the invention is the provision in a nut securing device of this class of a nut embracing body having at opposite sides engaging hooks projectable through an opening formed in a supporting body, so arranged and constructed that, upon a distortion or deformation of the nut embracing body, the hooks will be spread apart and fixed in engaging position on the supporting body.

Another object of the invention is the provision of a nut securing device of this class so arranged and constructed that when a bolt is threaded into the nut secured therein, the nut will be engaged at opposite sides and strain exerted thereon will be permitted to direct onto said nut a flexing action, thus serving to lock the nut on the bolt.

Another object of the invention consists in the provision of a method of attaching a nut securing body over an opening formed in a supporting body by means consisting in projecting securing members through the opening and spreading said securing members farther apart after their projection through the opening in the supporting body without distortion of the securing members themselves.

Another object of the invention is the provision of a securing device of this class which may be easily and quickly mounted in position and easily and quickly released from the position on the securing body in which it may have been mounted.

Other objects will appear hereinafter.

The invention consists in the combination and arrangement of parts hereinafter described and claimed.

The invention will be best understood by a reference to the accompanying drawing which forms a part of this specification, and in which, Fig. 1 is a perspective view of the securing device with a nut enclosed therein.

Fig. 2 is a sectional view taken on line 2—2 of Fig. 1.

Fig. 3 is a top plan view of the invention.

Fig. 4 is an end elevational view of the invention.

Fig. 5 is a perspective view of the invention showing it attached to a mounted body.

Fig. 6 is a sectional view taken on line 6—6 of Fig. 5.

Fig. 7 is an end elevational, sectional view of a modified form of the invention.

Fig. 8 is a sectional view taken in line 8—8 of Fig. 7.

Fig. 9 is a side view of a modified form of the securing device.

Fig. 10 is a plan view of the blank from which the invention is made.

In the construction of various articles, it is frequently necessary to project bolts through openings formed in certain parts and have a nut threaded on the bolt at a location which is inaccessible or at least very inconvenient to reach. Frequently, in the fabrication of some parts, after the device is completed, the nut is entirely enclosed and inaccessible so that should it jar loose from the nut it would be very difficult and some times impossible, without a destruction of the device, to again place a nut on the bolt. Various devices have been provided for securing the nut in position so that it will always be mounted permanently on the supporting body and held in alignment with the opening through which the bolt is to be projected and, at the same time, prevent it from rotating. An example of such a device is illustrated in United States Letters Patent No. 1,761,358, issued to me on June 3, 1930. In the device illustrated in the patent, however, it is necessary after the extrusion is projected through the opening in the panel, that it be upset by means of a suitable press. This necessitates the placing of the panel in position for operation by the press and entails a great deal of labor and consumes considerable time. Moreover, a device of this kind when secured in position is very difficult to remove, if its removal becomes necessary because of securing the wrong type of nut in position or for any other reason. The removal of such a device is particularly objectionable when it is mounted on a painted body, as its removal will necessitate the destruction or marring of the paint job. The present invention obviates these difficulties by providing a structure which may be very easily and quickly mounted in position and then secured fixed in the position in which it is mounted without the use of any such machinery as a punch, press or the like and without necessitating the bodily handling of the structure on which the device is to be mounted. Moreover, the present invention may be very easily and quickly removed without requiring the use of cutting equipment or machinery and without necessitating the marring or scratching of a paint job with which the supporting body may be provided.

The securing device comprises a body which encloses or surrounds the nut 14. The general construction of the body may be said to be box-like so as to afford the oppositely disposed side walls 15 and 16 and the end walls 17 and 18 and the bottom 19 through which is formed the hole 20. The size of this hole, of course, may vary but it must be sufficiently large to permit the projection therethrough of the bolt on which the nut 14 is to be threaded. The hole 20 if desired may be formed so large that the bottom would merely consist of marginal inwardly projecting flanges.

As shown in Figs. 1 and 10, the side walls are provided with the extensions in the form of a central tongue 21 flanked on opposite sides with the lug forming tongues 22. When the blank is formed into the shape shown in Fig. 1, the lug forming tongues 22 are bent inwardly to serve as abutments for the nut 14 and the tongues 21 are shaped to provide the hooks 23. It will be noted that the end walls 17 and 18 are pressed outwardly at their free edges to provide the portions 24 and 25 which are directed angularly to the plane of the side walls 15 and 16 and which meet at the point 26. When the nut is placed in the device and the lug forming tongues 22 and the hook forming tongues 21 are shaped as shown in Fig. 2, the nut will be enclosed in the securing device. The engagement of the nut in the securing device may be a loose one or the lug forming tongues 22 may be pressed downwardly tightly enough to engage the nut and prevent its movement in the enclosing device. If it is not desired that the tongues 22 be brought into such engagement, the box-like structure itself may be formed sufficiently large to permit play of the nut therein or it may be formed of a size sufficient to receive the nut and prevent its play.

In Fig. 5 I have shown the device mounted on a supporting body 27 in which the hole 28 is formed. In mounting the device the hooks 23 are projected through the hole which the securing device will overlie at least in one direction. In inserting the hooks through the opening, a slight pressure may be necessary so that a snapping effect will be produced.

In the form shown in Fig. 9 I have slitted the opposite side walls along the lines 29 and 30 and when the device is formed from spring metal the portions 31 will serve as spring tongues whereby the hooks may be sprung inwardly to permit the insertion of the same into the opening and effecting their snapping into position over the edges of the supporting body. The hooks will, of course, be formed of sufficient size so that they will engage over the edge of the supporting body.

In the form shown in Fig. 1, after the hooks have engaged over the supporting body as mentioned, the operator may, by using a pair of pliers or other suitable tool, and engaging the opposite end walls, press these end walls inwardly toward each other so as to move them from the full line position shown in Fig. 1 to the dotted line position to approach the dotted line 32 which indicates the normal position the end walls would occupy had they not been pressed outwardly and the metal stretched outwardly by the outward pressing. It is obvious that as these points 26 on the opposite end walls are moved toward each other, the inclined portions 24 and 25 will be moving out of their angular relative extension to approach a straight line in the position of the dotted line 32. It is obvious that they will effect an outward pressing of the side walls 15 and 16 so that the hooks are pressed outwardly to withdraw from each other and move into tight relation with the edges of the metal with which they are engaged. In this way the device is securely locked or fixed in position on the supporting body and thus the nut is secured in position at the opening formed in the supporting body.

Experience has shown that frequently an imperfect nut will be mounted on a body of this kind and instances have occurred where the wrong size nut has been mounted in position. In such instances it would, of course, be necessary to remove the securing device from the supporting body. With the present device, the operator would merely be required to engage the hooks by means of a pair of pincers, a pair of pliers, or the like, and flexing these tongues inwardly toward each other. This would not necessitate placing the device in any machine and should not result in a scratching or marring of any finish which may have been placed on the supporting body.

It will be noted that in the present invention there is no extrusion forming a continuance of the side walls and it will also be noted that once the device is formed, there is no deformation of the hooks in order to lock or fix the device in position on the supporting body. It will also be obvious that no great length of time would be required to affix the individual securing device in position and that no press or elaborate machinery is necessary.

The fixing of the hooks in engaging position with the supporting body is accomplished by distortion or deformation of the oppositely disposed end walls of the structure on which the tongues are carried. It will be obvious that the action consists in moving the end walls into relative approach to effect the relative withdrawal of the hooks.

In Fig. 7 I have shown a slightly modified form of the structure in which there is formed a bulge 33 on the bottom 19. This bulged portion corresponds to the outward bulging of the end walls 17 and 18. As the device is pressed in position, a flattening out of the bulge 33 will also effect a spreading of the hooks relatively to each other to securely fix them in engaging position to the supporting body. It will be noted that while I have used the terms "distortion" and "transformation" these terms all relate to an action which is in reality a bending of the material and consequently it is intended that the words "distortion" and "transformation" as used in the specifications and claims herein shall be interpreted as relating also to a bending action in which there is a permanent movement of the part of the nut securing cage from one position to another which will effect the binding action of the hooks or securing parts.

It will be noted that in the form shown in Fig. 8 the slits 29 and 30 do not extend to the bottom of the side walls 15 and 16 so that after the hooks on this form have been snapped into position, they may also be locked or fixed in position by deformation of the body in either of the two methods referred to.

When the bolt is threaded into the nut it will draw the nut tightly against the lug forming tongues 22 and in some instances against the inwardly turned portion of the hooks. But it will be noted that the nut is engaged on only two of its opposite edges. The nut is not engaged on the other two edges. Consequently, as the tightening of the nut onto the bolt continues, because the nut is engaged at two opposite sides only, the strain exerted upon the nut will have a tendency to flex the nut and, thus, the nut will bind on the bolt. The securing device, thus also operates as a lock nut.

Thus it is believed obvious that the advantages in a securing device of this class which are outlined have been attained and the disadvantages referred to have been avoided. Moreover, a structure economical to manufacture and easily and quickly installed and removed is thus provided.

While I have illustrated slightly different types of the structure, all embodying the general features which have been outlined as the elements on which invention is predicated, it is believed obvious that other variations and modifications might also be made without departing from the spirit of the invention or the scope of the claims which are attached hereto.

Having thus described my invention, what I claim as new and desire to secure by Letters Patent of the United States is:

1. A nut securing device of the class described, adapted for mounting on a supporting body having an opening formed therein, comprising: a body adapted for embracing a nut and having oppositely disposed side walls; a pair of spaced hooks on said body adapted for projecting through an opening formed in a supporting member and engaging the same; and a permanently distortable bulged portion on said body adapted upon being flattened for effecting a permanent spreading apart of said hooks and retaining the same in such position.

2. A nut securing device of the class described, adapted for securing a nut in position over an opening formed in a supporting body, comprising: a nut embracing body; a pair of spaced hooks carried by said body and projectable through said opening for engaging the supporting body; and permanently distortable means on said nut embracing body adapted upon distortion for moving said hooks permanently into further separated relation.

3. A nut securing device of the class described, comprising: a nut receiving body for holding and preventing rotation of said nut relatively to said body; a pair of spaced hooks on said body; and permanently distortable means on said body adapted upon distortion for permanently spreading said hooks farther apart.

4. A nut securing device, comprising: a nut receiving body adapted for holding a nut and preventing its rotation relatively to said body; a pair of spaced hooks on said body; and a permanently distortable bulge on said body adapted upon distortion for permanently spreading said hooks farther apart and retaining the same in such position.

5. A nut securing device of the class described, comprising: a nut receiving body adapted for holding a nut and preventing its relative rotation therein, said body having a pair of oppositely disposed end walls and a pair of oppositely disposed side walls; a hook carried on each of said side walls, said hooks being normally in spaced relation and adapted for projection through an opening in a supporting body for engaging the edges thereof; and a bulge on an end wall adapted upon distortion for spreading said side walls away from each other and spacing said hooks permanently farther apart.

6. A nut securing device of the class described, comprising: a nut receiving body adapted for reception of a nut and adapted for preventing rotation of said nut relatively thereto; means on said body for securing said nut therein; a pair of spaced hooks carried by said body and insertable in an opening of a supporting body for engaging the edges thereof; and distortable means on said body adapted upon distortion for permanently spreading said hooks farther apart.

7. A nut securing device of the class described, comprising: a body adapted for the reception of the nut for holding the same and preventing rotation of the same relative to said body; and a pair of resilient hooks carried by said body for snapping into an opening of a supporting body for retaining said nut receiving body in position overlying said opening; and distortable means on said nut receiving body adapted upon distortion for permanently spreading said hooks apart and permanently locking the same in engagement with the supporting body.

8. A nut receiving device of the class described, comprising: a box-like structure adapted for the reception of a nut; outwardly bulged end walls on said structure; side walls on said structure; engaging hooks projecting beyond the edges of said side walls for insertion into an opening formed in a supporting structure for engaging the same, the inward distrotion of said end walls effecting a further spreading apart of said sidewalls.

9. A nut receiving device of the class described, comprising: a box-like structure adapted for the reception of a nut; outwardly bulged end walls on said structure; side walls on said structure; engaging hooks projecting beyond the edges of said side walls for insertion into an opening formed in a supporting structure for engaging the same, the inward distortion of said end walls effecting a further spreading apart of said side walls; and engagement means on each of said side walls for engaging said nut and retaining the same in said box-like structure.

10. In a nut securing device, a nut receiving structure for holding said nut and preventing rotation of the same relatively thereto; a pair of hooks carried by said structure and adapted for projecting through an opening formed in a supporting structure for engaging said structure and retaining said nut receiving structure in overlying position relatively to said opening; and permanently distortable means adapted upon distortion for permanently spreading said hooks apart into engagement with the supporting structure and resisting movement of the same from such position.

11. A nut securing device of the class described adapted for mounting on a supporting body having an opening formed therein, comprising: a nut receiving structure for holding said nut and preventing rotation of the same relatively thereto; spaced means carried on said structure and projectable through said opening and engageable with the edges thereof; and permanently distortable means on said structure adapted upon distortion for moving said means permanently into tight engagement with the edges of said opening and resisting movement of the same out of engagement therewith.

12. A nut securing device of the class described adapted for mounting on a supporting body having an opening formed therein, comprising: a nut receiving structure adapted for holding a nut and preventing rotation of the same relatively thereto; means carried by said structure and projectable through said opening for retaining said structure in overlying relation to said opening, said means engaging the edge of the opening; a portion on said means for overlying said edge; and permanently distortable means on said structure adapted upon distortion for effecting a permanent locking of said portion in said overlying relation.

13. A nut securing device of the class described adapted for mounting on a supporting body having an opening formed therein, comprising: a body adapted for embracing a nut and retaining the same thereon; hook forming members carried by said embracing body and projectable through said opening in engagement with the sides thereof, said embracing body being larger than said opening and overlying the same and in engagement with one face of said supporting body, said hooks being projected beyond the opposite face; and means carried by said embracing body, accessible from the side of said supporting body on which said embracing body lies, for moving said hooks into clenching relation to said supporting body.

14. A nut securing device of the class described, comprising: a nut embracing body of greater area than the opening of the supporting body with which used; tongues carried by said embracing body and projectable through said opening; and means on said embracing body accessible from the side of said supporting body on which said embracing body lies for moving said tongues into clenching relation with the opposite side of said supporting body.

15. A nut securing device of the class described adapted for mounting on a supporting body having an opening formed therein, comprising: a nut embracing body for embracing a nut and retaining the same thereon, said body being of greater width than the opening of the supporting body with which used so as to overlie said opening; securing means carried by said embracing body and projectable through said opening and means on said embracing body accessible from the side of said supporting body on which said embracing body lies for moving and permanently retaining said securing means into securing engagement with said supporting body.

EDWARD W. MITCHEL.